W. GARDINER.
STORAGE BATTERY.
APPLICATION FILED SEPT. 29, 1916. RENEWED FEB. 12, 1919.
1,322,102.                                      Patented Nov. 18, 1919.
2 SHEETS—SHEET 1.
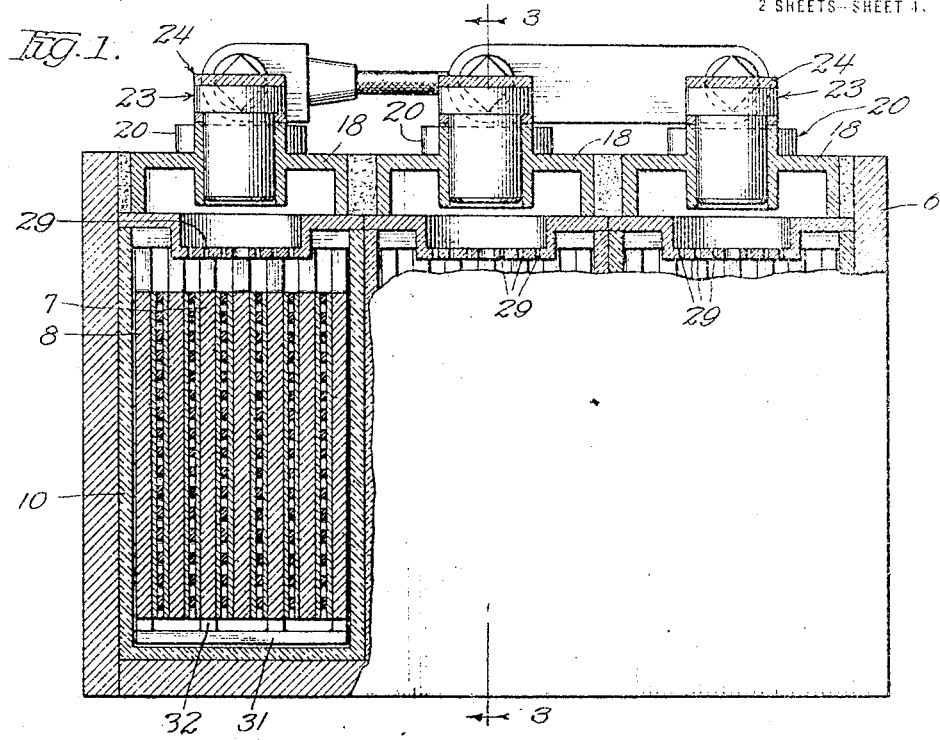
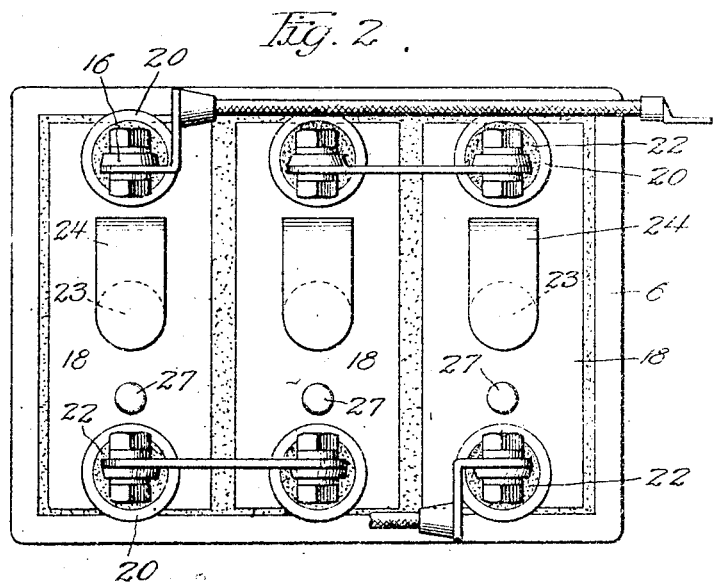
Witnesses.
Robert H. Weir
Arthur N. Carlson
Inventor
William Gardiner
By Charles C. Bulkley
Attys W. GARDINER.
STORAGE BATTERY.
APPLICATION FILED SEPT. 29, 1916. RENEWED FEB. 12, 1919.

1,322,102.

Patented Nov. 18, 1919.
2 SHEETS—SHEET 2.

Witnesses:
Robert Weir
Arthur W. Carson

Inventor
William Gardiner
By Charles C. Buckley
Attys

UNITED STATES PATENT OFFICE.

WILLIAM GARDINER, OF CHICAGO, ILLINOIS, ASSIGNOR, BY MESNE ASSIGNMENTS, TO WILLIAM H. DUGGAN, OF CHICAGO, ILLINOIS.

STORAGE BATTERY.

1,322,102. Specification of Letters Patent. Patented Nov. 18, 1919.

Application filed September 29, 1916, Serial No. 122,841. Renewed February 12, 1919. Serial No. 276,697.

*To all whom it may concern:*

Be it known that I, WILLIAM GARDINER, a citizen of the United States of America, and resident of Chicago, Cook county, Illinois, have invented a certain new and useful Improvement in Storage Batteries, of which the following is a specification.

My invention relates to an improvement in storage batteries, and has for its object the provision of a battery having increased efficiency and greater durability.

One of the special objects of my invention is the provision of means to prevent undue heating of the battery and also means for preventing the plates from buckling.

These and other features of my invention will be more readily understood by having reference to the accompanying drawing in which—

Figure 1 is a front elevation partly in section of a battery of three cells embodying the features of my invention;

Fig. 2 is a plan view of the same;

Figure 3:
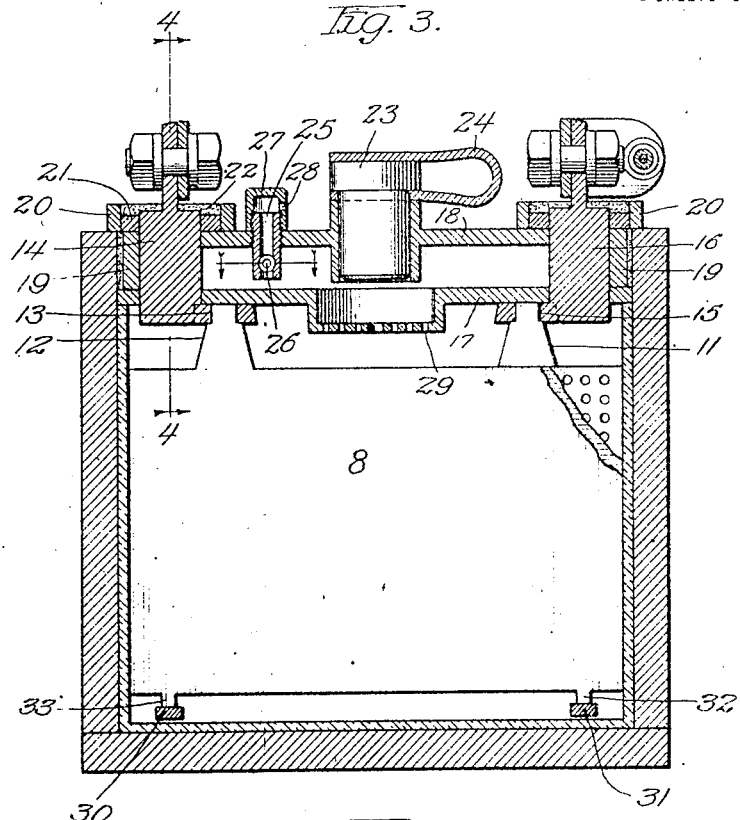
Fig. 3 is a sectional view taken on the line 3—3 of Fig. 1.
Figure 4:
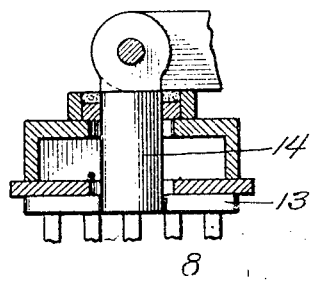
Fig. 4 is a section of the view taken on the line 4—4 of Fig. 3.
Figure 5:
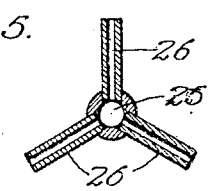
Fig. 5 is a sectional view taken on the line 5—5 of Fig. 3.

As illustrated, I have shown a group of three cells mounted in a suitable containing box 6 of wood or other suitable insulating material. Each of these cells are similar in construction, and I will, therefore, describe but one of these. Each cell comprises a plurality of positive electrode plates 7 and negative electrode plates 8 alternately arranged in the usual manner and separated by suitable separators 9. These electrode plates can be of any of the well known types and their particular construction forms a part of my present invention. These plates are mounted in a suitable container 10 of fiber, rubber or other insulating material. The electrode plates are provided with upwardly extended terminals 11, 12, the terminals for the positive plates being arranged on one side of the cell and the terminals of the negative plates on the opposite side in the usual manner. The positive terminals are multiplied together by means of the connecting strap 13 which is provided with an upwardly extending terminal member 14, while the negative plates are multiplied together in a similar manner by the strap 15 provided with the upwardly extended terminal member 16.

In order to close the top of the cell, I provide a box-shaped member consisting of a bottom member 17 and a top plate 18 which is provided with downwardly extending side flanges 19, the bottom edges of which are suitably secured to the bottom member 17, thus making a unitary box-like structure. The terminal members 14 and 16 extend through this box-like structure and the ring or cup 20 is placed on top of the cover around each terminal member. A fiber washer 21 is slipped over the end of the terminal member and fits within the bottom of the cup 20 and then suitable sealing material 22 is placed around the terminal member on top of the washer, thus forming a tight acid proof connection about the terminal members. In the center of the top there is a suitable opening 22 for filling or other purposes which is closed by means of the stopper 23 carried by the flexible member 24 which prevents misplacement of the stopper. Likewise in the top plate there is a gas vent consisting of the tube 25 having a plurality of hollow radial extensions 26 at its lower end. A suitable cap 27 is screwed onto the top of the tube and an opening 28 provided at the side of this cap to permit the escape of the gases.

Immediately below the central opening 22 the bottom member 17 is provided with a downwardly projecting portion, the bottom of which is provided with a series of openings 29 thus forming a perforated plate, the central opening of which is made sufficiently large to permit the insertion of a suitable testing instrument. The purpose of this perforated plate thus formed is to prevent too much liquid being withdrawn from the battery by means of the usual suction tube employed. The suction tube can not be inserted farther than this perforated plate and thus if the battery is filled above the plate and then all liquid possible withdrawn by means of this suction tube, the level of the liquid will be lowered to the level of the perforated plate which is positioned the proper height above the plates. In this manner the proper amount of liquid in the battery can be readily maintained.

It will also be noticed that the box-shaped cover, which has been described, provides considerable air space above the battery and this operates to prevent undue heating of the battery as it is found that the temperature of the plates and the electrolyte is not increased to such a great extent when a battery of this construction is employed as when the usual type of battery having a solid sealed cover is employed.

In practice it is found that the electrode plates have a tendency to bend and buckle owing to the expansion of the active material. While the plates are rigidly connected together at the top by means of the connecting straps 13 and 15, still this has been found insufficient to prevent the buckling of the plates. I, therefore, provide a pair of tie members 30 and 31 secured to opposite sides of the lower edges of the plates of one polarity, preferably the positive, by means of downwardly extending lugs 32 formed on the plates. These tie members operate to rigidly hold the plates in position and thus prevent buckling of the same. And as the positive plates are the ones most liable to buckle I, as above stated, preferably secure these members to the positive plates although if desired they could be secured to the negative plates. The plates which are not secured together by tie members at their lower edge are prevented from buckling by reason of the fact that they are held firmly between two plates which are held in position by the tie members as above described.

It will thus be seen that I have devised a very efficient battery construction and one in which the life of the plates is increased by reason of the elimination of the danger of buckling. Also the efficiency of the battery is increased by reason of the fact that undue heating is prevented by reason of the air space formed by the member.

While I have illustrated and described one specific embodiment of my invention it will be understood that I do not wish to be limited to the exact construction shown and described, but that various changes and modifications may be made without departing from the spirit and scope of my invention.

I claim:

1. In storage battery construction, a containing cell, a plurality of electrode plates mounted in said cell, a cover for said cell, said cover comprising a hollow box-like structure having a top plate provided with a central opening, a bottom plate secured to and positioned a short distance below said top plate, said bottom plate being provided with a perforated portion immediately below the opening in said top plate.

2. In storage battery construction, a containing cell, a plurality of electrode plates mounted in said cell, a cover for said cell comprising a bottom member and a perforated plate carried by said bottom member and located a definite distance above the upper surface of said electrode plates whereby the proper level for liquid in said cell may be accurately determined.

3. In storage battery construction, a containing cell, a plurality of electrode plates mounted therein, a cover for said cell, terminals extending through said cover and secured to said plates, said cover consisting of an upper and lower member suitably spaced apart, a gas vent in said upper member, and a plurality of perforations in the central portion of said lower member.

4. In a storage battery construction, a containing cell, a plurality of electrode plates mounted therein, a cover for said cell, said cover including a member provided with a downwardly extending central portion, the bottom surface of said central portion being perforated whereby the height of the liquid in said containing cell may be accurately and readily regulated.

5. In storage battery construction, a containing cell, a cover therefor, said cover comprising a top plate having a gas vent therein, a bottom plate spaced apart from said top plate and forming an air space therebetween, and a cup-shaped extension projecting downwardly from said bottom plate, the bottom of said cup-shaped extension being provided with a perforation to permit the passage of a test implement.

Signed by me at Chicago, Illinois, this 18 day of September, 1916.

WILLIAM GARDINER.

Witnesses:
E. H. CLEGG,
AMY JEHLE.